Dec. 22, 1953         M. C. TEVES ET AL         2,663,814
            ELECTRON-OPTICAL IMAGE INTENSIFIER
                    Filed Oct. 15, 1951
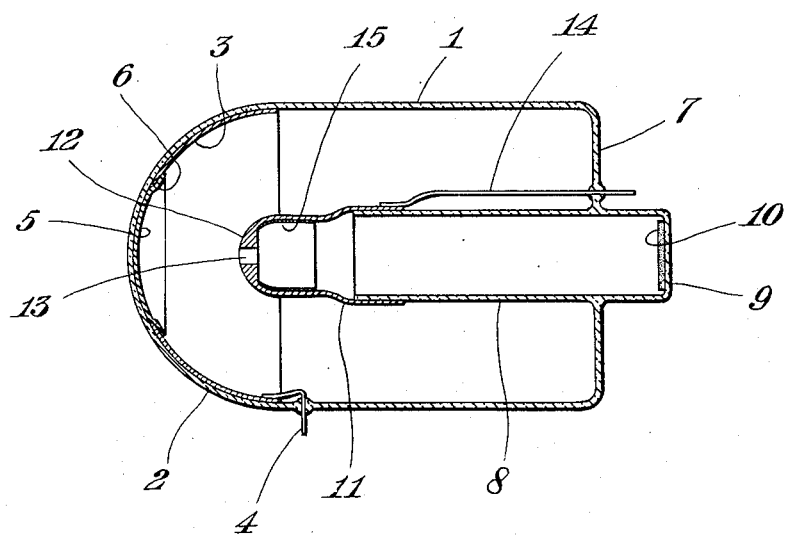
INVENTORS.
MARTEN CORNELIS TEVES
TAEKE TOL
BY
AGENT.

Patented Dec. 22, 1953

2,663,814

UNITED STATES PATENT OFFICE 2,663,814

ELECTRON-OPTICAL IMAGE INTENSIFIER

Marten Cornelis Teves and Taeke Tol, Eindhoven, Netherlands, assignors to Hartford National Bank and Trust Company, Hartford, Conn., as trustee Application October 15, 1951, Serial No. 251,296

Claims priority, application Netherlands October 30, 1950

3 Claims. (Cl. 313—65)

In known electron-optical image intensifiers, comprising a photo-electric cathode and a collecting screen, the latter is generally formed by a luminescent substance which is caused to emit visible radiation by the incidence of electrons. There is an inherent disadvantage, in that the method for forming the photo-electric active layer is detrimental to the luminous properties of the luminescent substance. The photo-electric sensitive layer is generally applied to the wall of the tube, and the luminescent layer is applied to an opposed part of the wall. In this case, they cannot be manufactured in separate spaces.

The photo-cathode is formed, for example, by deposition of an alkali metal from the vapour phase on a conductive layer. This conductive layer must be adapted for photo-electric activation and is generally formed by silver or by antimony. By admitting oxygen and then caesium vapour or, if the conductive layer is made of antimony, only caesium vapour into the tube, the wall coating is rendered photo-electrically active and after the amount of caesium for obtaining the required sensitivity is deposited, the superfluous vapour is pumped from the tube. All the vapour cannot be removed by the exhaustion, but the small amount which is left in the tube can be rendered inoffensive by a gas binder. The latter generally constituted by applying to the tube wall an amount of one of the substances known per se having the property of combining with caesium at a temperature lower than that which is required for forming the photo-cathode in the tube. In literature, mention is made of lead oxide, tin oxide, gold, selenium, graphite and aquadag as suitable substances which at ordinary temperatures have great affinity to caesium.

The luminescent layer generally contains substances which have this property to a slight extent, such as zinc sulphite, cadmium sulphide, zinc selenide, cadmium selenide or the like. They are attacked by caesium and this affects the light output. One means for increasing the useful light output of a luminescent layer is to coat this layer on the side adjacent the photo-cathode with a mirror of metal thin enough to pass the electrons. This screen mirror reduces the velocity of attack of the luminescent substance by the caesium but, by reason of its small thickness, is not capable of preventing this attack after a time.

The object of the invention is to improve tubes of the above-described kind so as to avoid further the reduction of the light output of the luminescent screen. According to the invention, the tube comprises an anode for applying the acceleration voltage in which a small aperture is formed for the passage of the electrons and which divides the discharge vessel into two parts one of which contains the photo-electric cathode and the other the luminescent screen. The space containing the luminescent screen contains an amount of some substance active as a binder for the vapour of the activating material.

In order that the invention may be readily carried into effect, an example will now be described in detail with reference to the accompanying drawing.

A tube comprises a glass wall 1 of circular cross-section. It is sealed at one end by a spherical bottom 2. This bottom is coated, with the exception of a portion where the photo-electric cathode is formed, with a thin conductive layer 3 which is electrically connected to a current lead 4. The layer 3 may be of aluminium. The window 5 in the aluminium layer is coated with a thin transparent metal layer 6 which is formed by deposition of a suitable metal, preferably silver or antimony. It is rendered light-sensitive in known manner by the action of caesium vapour so as to be capable to operate as a photo-electric cathode.

The aluminium layer may be extended over part of the cylinder wall in order to avoid uneven wall charges but this purpose may also be served by aquadag or some other conductive substance which is able to combine with the caesium left after the removal of the superfluous caesium vapour.

The other end of the tube is sealed by a substantially flat bottom piece 7 which carries a cylindrical tube 8. This tube extends partially in the tube and partially outside the tube. The outwardly protruding part is sealed by a flat bottom 9 coated with a luminescent layer 10. In addition, the tube 8 carries a metal cap 11 which constitutes the anode of the tube. The spherical head 12 of the anode and the concave cathode surface constitute together an electron-optical system by which the cathode rays which penetrate through an aperture 13 into the head are focussed so as to form the image of the window 5 on the screen 10. The section of the aperture 13 is small compared with the cathode surface. The anode has secured to it a current lead 14 which is vacuum-tight sealed through the bottom 7.

The anode tube 8 contains an amount of some substance or binder having a high affinity to caesium. It is preferably applied as a superficial layer 15 to the wall of the anode cap 11 immediately behind the aperture 13. Suitable binders are, for example, silver, gold or graphite.

The small width of the aperture 13 forms an obstruction to the extension of the caesium vapour in the space comprising the fluorescent screen and this is utilised, by introducing the caesium binder into this space, to keep low the vapour tension of the caesium. The lower the vapour tension, the less intense is the attack on the luminescent substance. If a thin conductive coating of the luminescent layer is used, the attacking speed is moreover displaced in favour of the binder so that the luminescent layer which, as it is, is slightly protected by the conductive layer is no longer appreciably attacked.

What we claim is:

1. An electron-optical image intensifier device comprising an evacuated envelope, an anode dividing said envelope into two portions, a photo-electric cathode including an activating material disposed in one of said portions for producing cathode-rays upon excitation, a luminescent image screen disposed in the other of said portions in a position to intercept said cathode-rays, said anode having a small aperture for the passage of said cathode-rays from said cathode to said screen, and a binding substance for the activating material disposed on a wall of said anode in the portion of said envelope containing the luminescent screen.

2. An electron-optical image intensifier device comprising an evacuated envelope, an anode dividing said envelope into two portions, a photoelectric cathode comprising a conductive layer rendered photo-electrically active by deposition thereon of an alkali metal from the vapour phase so that it produces cathode-rays upon excitation, said cathode being disposed in one of said two portions, a luminescent image screen constituted by a material which reacts with the alkali metal, said screen being disposed in the other of said two portions in a position to intercept said cathode-rays, said anode having a small aperture for the passage of said cathode-rays from said cathode to said screen, and a substance having the property of readily reacting with the vapor of the alkali metal being disposed on a wall of said anode in the portion of said envelope containing the luminescent screen.

3. An electron-optical image intensifier device as claimed in claim 2 in which said substance is applied as a thin layer to a wall of the anode in the immediate vicinity of the aperture.

MARTEN CORNELIS TEVES.
TAEKE TOL.

References Cited in the file of this patent

UNITED STATES PATENTS

| Number | Name | Date |
|---|---|---|
| 2,064,369 | Biggs | Dec. 15, 1936 |
| 2,179,083 | Bruche et al. | Nov. 7, 1939 |
| 2,189,322 | Flory | Feb. 6, 1940 |
| 2,613,330 | Bruining et al. | Oct. 7, 1952 |